(12) United States Patent
Wakahara

(10) Patent No.: US 8,462,373 B2
(45) Date of Patent: Jun. 11, 2013

(54) JOB-SHARING AMONG INTERCONNECTED IMAGE FORMING APPARATUSES

(75) Inventor: Shinichi Wakahara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 676 days.

(21) Appl. No.: 12/476,472

(22) Filed: Jun. 2, 2009

(65) Prior Publication Data

US 2009/0316194 A1    Dec. 24, 2009

(30) Foreign Application Priority Data

Jun. 19, 2008    (JP) ................................ 2008-160350

(51) Int. Cl.
G06F 3/12    (2006.01)

(52) U.S. Cl.
USPC ........ 358/1.15; 358/1.13; 358/1.14; 709/201; 709/208

(58) Field of Classification Search
USPC ................ 358/1.13, 1.14, 1.15; 709/201, 208
See application file for complete search history.

(56) References Cited

U.S. PATENT DOCUMENTS

| | | | |
|---|---|---|---|
| 6,738,151 B1 * | 5/2004 | Kato | 358/1.12 |
| 2003/0063313 A1 * | 4/2003 | Ito | 358/1.15 |
| 2004/0184098 A1 * | 9/2004 | Niitsuma | 358/1.15 |
| 2004/0190019 A1 * | 9/2004 | Li et al. | 358/1.9 |

FOREIGN PATENT DOCUMENTS

| | | |
|---|---|---|
| JP | 8-116429 | 5/1996 |
| JP | 2002-109527 | 4/2002 |
| JP | 2003-101782 | 4/2003 |
| JP | 2003-224698 | 8/2003 |
| JP | 2003224698 A * | 8/2003 |
| JP | 2004-120340 | 4/2004 |
| JP | 2004-358875 | 12/2004 |
| JP | 2005-20224 | 1/2005 |
| JP | 2006-13882 | 1/2006 |
| JP | 2006-13924 | 1/2006 |
| JP | 2006-80941 | 3/2006 |
| JP | 2006-229466 | 8/2006 |
| JP | 2007-300677 | 11/2007 |

OTHER PUBLICATIONS

Office Action issued Jun. 5, 2012, in Japanese Patent Application No. 2008-160350.

* cited by examiner

*Primary Examiner* — Jacky Z Zheng
(74) *Attorney, Agent, or Firm* — Oblon, Spivak, McClelland, Maier & Neustadt, L.L.P.

(57) ABSTRACT

Each of a plurality of image reading units reads an image of an original and outputs image data. An image processing unit performs an image processing on the image data based on either one of a read characteristic of the image data and a parameter set according to the read characteristic of the image data. A storing unit stores therein the image data. A printing unit prints the image data processed by the image processing unit. A communication unit exchanges the image data stored in the storing unit with other image forming apparatus for sharing printing of the image data.

20 Claims, 14 Drawing Sheets

| IN | | OUT | | | |
|---|---|---|---|---|---|
| DETECTION | X CALCULATION | X1 | Y1 | X2 | Y2 |
| 0 | 0 | $V_{IN}$ | H | Z | L |
| 0 | 1 | H | $V_{IN}$ | L | Z |
| 1 | 0 or 1 | L | $V_{IN}$ | L | Z |

FIG. 13

A ———
B ———
C ——— IN CASE OF PRINTING FOUR
D ——— COPIES OF A, B, C, D

| | OPERATING-SIDE APPARATUS | LINKED-SIDE APPARATUS |
|---|---|---|
| 1. ELECTRONIC SORTING OUTPUT | D ———<br>C ———<br>B ———<br>A ———<br><br>D ———<br>C ———<br>B ———<br>A ——— | D ———<br>C ———<br>B ———<br>A ———<br><br>D ———<br>C ———<br>B ———<br>A ——— |
| 2. SIMPLE SHARED-STACKING OUTPUT | D ═══<br>C ═══<br>B ═══<br>A ═══ | D ═══<br>C ═══<br>B ═══<br>A ═══ |
| 3. ORIGINAL HALF-SPLITTING SHARED-STACKING OUTPUT | B ———<br><br>A ——— | D ———<br><br>C ——— |
| 4. ORIGINAL EVEN-ODD-SPLITTING SHARED-STACKING OUTPUT | C ———<br><br>A ——— | D ———<br><br>B ——— |

JOB-SHARING AMONG INTERCONNECTED IMAGE FORMING APPARATUSES

CROSS-REFERENCE TO RELATED APPLICATIONS

The present application claims priority to and incorporates by reference the entire contents of Japanese priority document 2008-160350 filed in Japan on Jun. 19, 2008.

BACKGROUND OF THE INVENTION

1. Field of the Invention

The present invention relates to a technology for performing a printing job in a shared manner between connected image forming apparatuses.

2. Description of the Related Art

The conventional image forming apparatuses such as copying apparatuses are classified into low-speed apparatuses, medium-speed apparatuses, and high-speed apparatuses according to their intended use or copying speeds. The general trend indicates that the sales price increases as the copying speed of the copying apparatuses increases. Usually, high-speed apparatuses are used at copy centers for large-quantity copying. On the other hand, in average-sized offices, low-speed apparatuses or medium-speed apparatuses are widely used. Although the use frequency of a copying apparatus in an office is average throughout the year, there are times such as at weekends, month ends, or year ends when it is necessary to temporarily perform large-quantity copying. However, such exceptional cases of large-quantity copying do not merit a substantial investment for installing a high-speed apparatus.

Thus, to tackle such exceptional cases of temporary large-quantity copying without installing a high-speed apparatus, two copying apparatuses each capable of reading image data from an original image, storing the image data in a memory device, and outputting the image data can be installed in an interconnected manner via a data communicable interface. Consequently, it becomes possible to transfer the image data read by one of the copying apparatuses to the other copying apparatus and output the image data by using both the copying apparatuses. That doubles the copying productivity thereby enabling large-quantity copying if and when necessary.

Meanwhile, Japanese Patent Application Laid-open No. 2002-109527 or Japanese Patent Application Laid-open No. 2006-13882 discloses an image forming apparatus having a simultaneous two-side reading functionality in which separate reading units are used to simultaneously read the front surface and the rear surface of a two-side original thereby enhancing the productivity.

However, in the case of concurrent reading with the use of a plurality of image forming apparatuses or in the case when a single image forming apparatus includes a plurality of reading units, the difference in read characteristics of each reading unit causes the print result to have different print qualities.

SUMMARY OF THE INVENTION

It is an object of the present invention to at least partially solve the problems in the conventional technology.

According to one aspect of the present invention, there is provided an image forming apparatus that is configured to be connected to other image forming apparatus each including a printing unit. The image forming apparatus includes a plurality of image reading units each reading an image of an original and outputting image data; an image processing unit that performs an image processing on the image data based on either one of a read characteristic of the image data and a parameter set according to the read characteristic of the image data; a storing unit that stores therein the image data; a printing unit that prints the image data processed by the image processing unit; and a communication unit that is capable of exchanging the image data stored in the storing unit with the other image forming apparatus. The communication unit sends the image data output by the image reading units to the other image forming apparatus for sharing printing of the image data.

Furthermore, according to another aspect of the present invention, there is provided an image forming system including a first image forming apparatus and a second image forming apparatus connected to each other. The first image forming apparatus includes a plurality of image reading units each reading an image of an original and outputting image data, a first image processing unit that performs an image processing on the image data based on either one of a read characteristic of the image data and a parameter set according to the read characteristic of the image data, a first storing unit that stores therein the image data, a first printing unit that prints the image data processed by the first image processing unit, and a first communication unit that is capable of exchanging data stored in the first storing unit with the second image forming apparatus. The second image forming apparatus includes a second communication unit that is capable of exchanging data with the first image forming apparatus, a second storing unit that stores therein the image data and a parameter set according to a read characteristic of the image data received from the first image forming apparatus, a second image processing unit that performs an image processing on the image data stored in the second storing unit based on the parameter, and a second printing unit that prints the image data processed by the second image processing unit. The first image forming apparatus and the second image forming apparatus share a printing of the image data output by the image reading units.

Moreover, according to still another aspect of the present invention, there is provided an image forming method for an image forming apparatus that is configured to be connected to other image forming apparatus each including a printing unit. The image forming method includes reading including each of a plurality of image reading units reading an image of an original and outputting image data; processing including an image processing unit performing an image processing on the image data based on either one of a read characteristic of the image data and a parameter set according to the read characteristic of the image data; storing the image data in a storing unit; printing including a printing unit printing the image data processed at the processing; and communicating including a communication unit exchanging the image data stored at the storing with the other image forming apparatus. The communicating further includes the communication unit sending the image data output at the reading to the other image forming apparatus for sharing printing of the image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a schematic diagram for explaining examples of distributing print jobs between two interconnected image forming apparatuses;

DETAILED DESCRIPTION OF THE PREFERRED EMBODIMENTS

Exemplary embodiments of the present invention are described in detail below with reference to the accompanying drawings. The present invention is not limited to these exemplary embodiments. The exemplary embodiments described below are specific preferred examples of the present invention and as such, various technical limitations have been attached as deemed necessary. However, the scope of the present invention is by no means limited to those embodiments unless otherwise limited within the description of the present invention given below.

Figure 1:
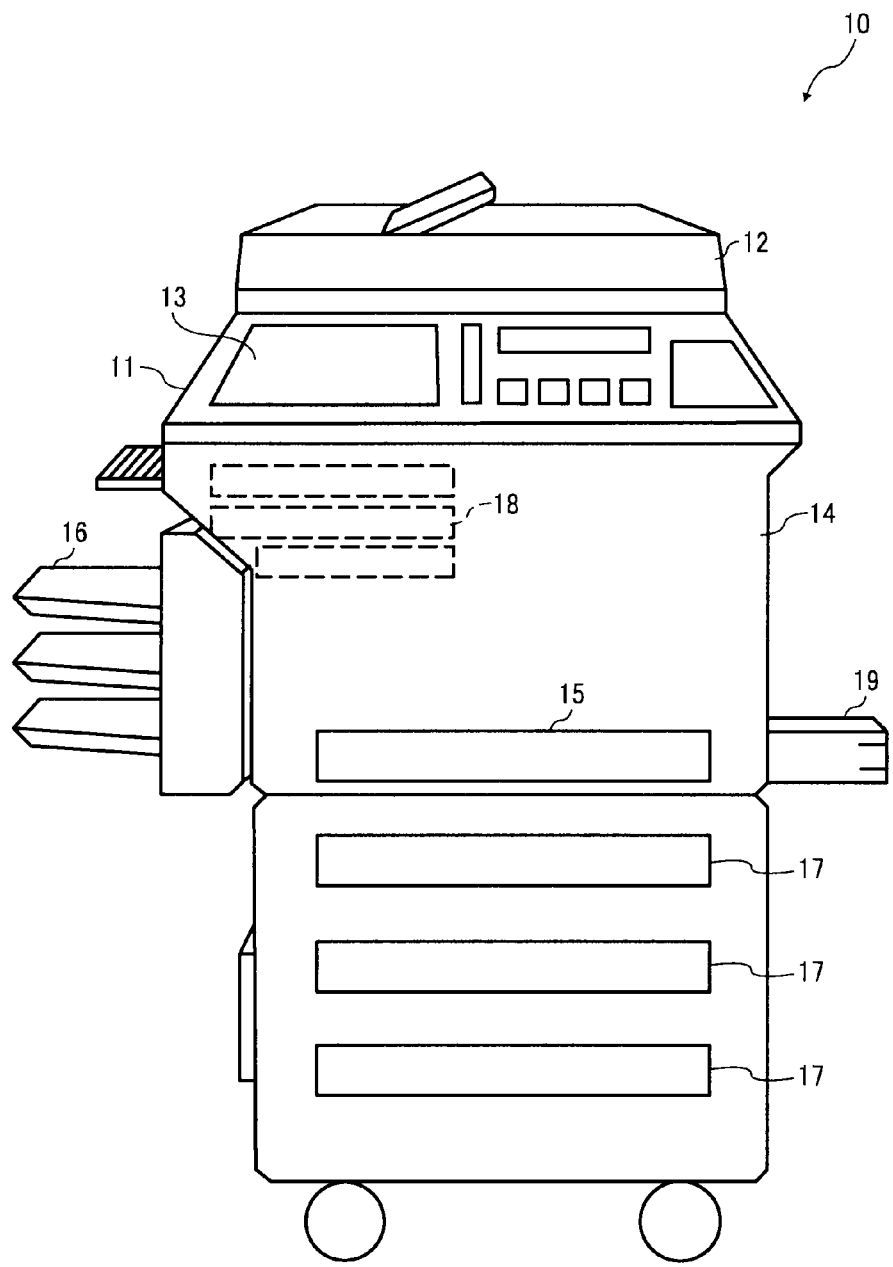
FIG. 1 is a block diagram of an image forming apparatus according to an embodiment of the present invention.

FIG. 1 is a block diagram of an image forming apparatus 10 according to an embodiment of the present invention. The image forming apparatus 10 shown in FIG. 1 includes an image reading unit 11 for reading an image, an ADF 12, an operation display unit 13, an image forming unit 14 (that includes an image writing unit 71 for image processing and printing), a two-side unit 15, a discharged-sheet sorting unit 16, a feeding cassette 17, an add-on unit 18, and a user regulating unit 19.

The image reading unit 11 illuminates an original with a light source, converts the light reflected from the original into an electrical signal with a photoelectric conversion reading device, and performs a variety of functions such as quantization, shading correction, modulation transfer function (MTF) correction, and zooming. In the present embodiment, the image reading unit 11 is made of two image reading units each equipped with a photoelectric conversion reading device. In the image reading unit 11, the process of quantization is performed to convert analog data, which has been converted into an electrical signal by a charge-coupled device (CCD), into binary data or multivalued data. The process of zooming is performed to change reading density for an image and perform data interpolation by using the read image data. The process of shading correction is performed to correct illumination fluctuation of the light source illuminating the original and fluctuation in photographic sensitivity of the CCD. The process of MTF correction is performed to correct blurring attributed to an optical system.

The ADF 12 is arranged on top of the image reading unit 11 for automatically feeding originals. The operation display unit 13 is also arranged on top of the image reading unit 11 for displaying status of the image forming apparatus 10 to the user and for displaying an operation screen that the user can use to input instructions.

The image forming unit 14 includes the two-side unit 15, the discharged-sheet sorting unit 16, and the feeding cassette 17. The image forming unit 14 performs electrophotographic printing, direct thermal printing, thermal transfer printing, or inkjet printing on an image received in an electrical signal and forms an image on a sheet of regular paper or heat-sensitive paper.

The add-on unit 18 controls add-on functions (applications) executable in the image forming apparatus 10. One of the features of the image forming apparatus 10 is to convert an image into an electrical signal for reading and restore the electrical signal in the image forming unit 14.

The user regulating unit 19 is used to identify, limit, and administer the users. For example, the user regulating unit 19 can be a coin rack, a key counter, a key card, or a prepaid card. Particularly, in the case of an image forming apparatus that implements an electrophotographic process, large consumption of electricity creates substantial opportunities to restrict the use of the image forming apparatus. Moreover, at times, secret identification codes are used to restrict the users from using the image forming apparatus.

Figure 2:
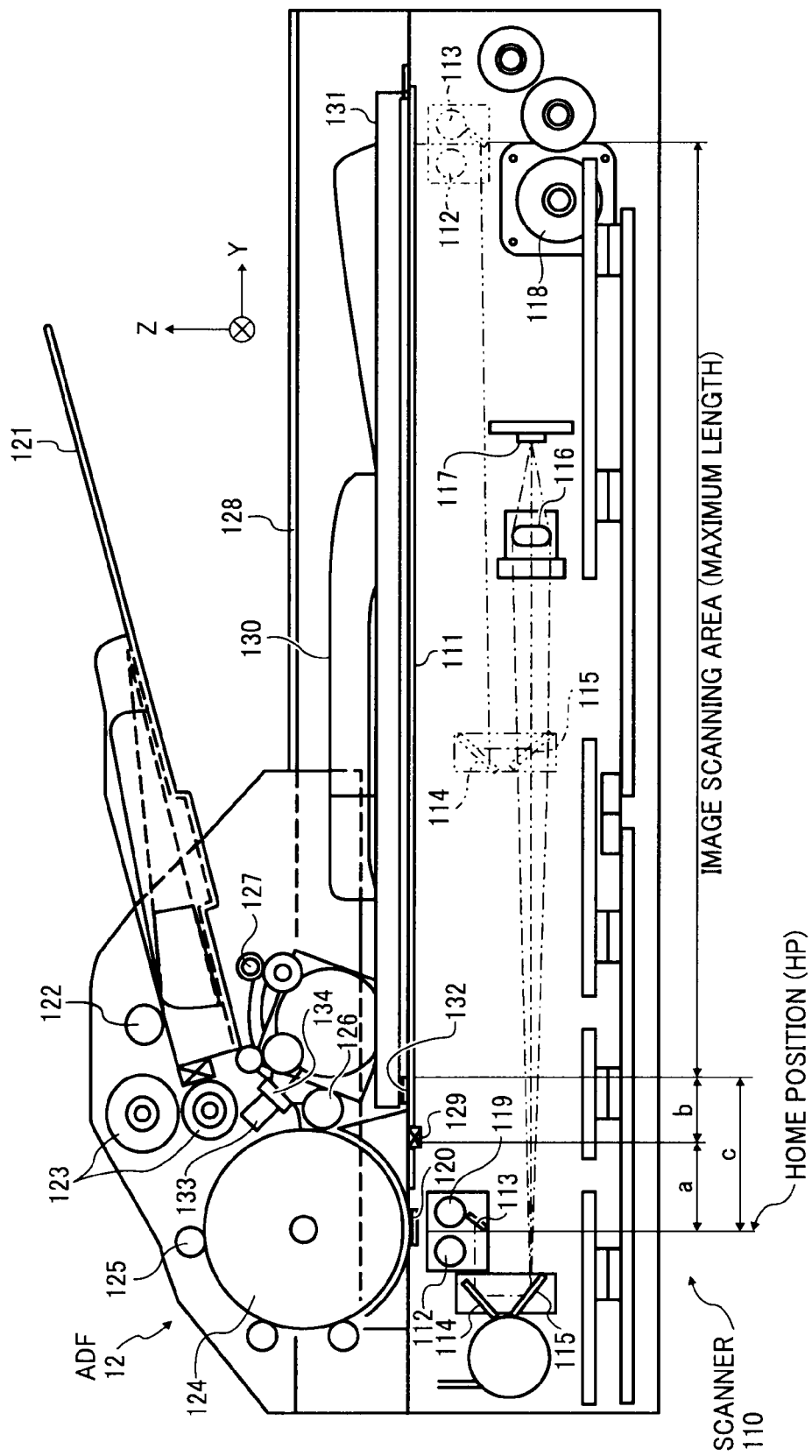
FIG. 2 is a schematic diagram for explaining an exemplary detailed configuration and operations of an image forming unit that includes an auto document feeder (ADF) shown in FIG. 1.

FIG. 2 is a schematic diagram for explaining an exemplary detailed configuration and operations of an image forming unit including the ADF 12.

As shown in FIG. 2, an original is placed on an exposure glass 111 of a scanner 110. An illumination lamp 112 illuminates the original and the light reflected from the original (image light) reflects from a first mirror 113 along a sub-scanning direction y. The illumination lamp 112 and the first mirror 113 are mounted on a first carriage (not shown) that moves to and fro at a constant speed along the sub-scanning direction y. A second mirror 114 and a third mirror 115 are mounted on a second carriage (not shown) that moves to and fro at half the speed of the first carriage along the sub-scanning direction y. The image light reflected from the first mirror 113 then sequentially reflects from the second mirror 114 in a downward direction (in direction z) and from the third mirror 115 along the sub-scanning direction y and eventually falls on a lens 116. The lens 116 then focuses the reflected light on a CCD 117 such that the reflected light is converted into an electrical signal.

A carriage motor 118 moves the first carriage and the second carriage to (original scanning) and fro (return) along the sub-scanning direction y. Thus, the scanner 110 is a flat-head scanner that scans the original placed on the exposure glass 111 with the illumination lamp 112 and the first mirror 113 and projects an original image on the CCD 117. Meanwhile, to enable the scanner 110 to perform sheet-through scanning, a reading glass 120 that functions a sheet-through scanning window is arranged at a scanning view position of the first mirror 113 when the first carriage is at rest at a home position (HP) (standby position). The ADF 12 is arranged above the reading glass 120 with a conveyer drum 124 (platen) facing the reading glass 120.

The originals stacked in an original tray 121 of the ADF 12 are sequentially fed with a pickup roller 122 and a pair of registration rollers 123 toward a space between the conveyer drum 124 and a pressing roller 125. Consequently, the fed original passes over the reading glass 120 while making close contact with the conveyer drum 124 and gets discharged to a discharge tray 128, which also functions as a pressure plate, by discharge rollers 126 and 127.

When the original passes over the reading glass 120, an image on the front surface of the original is illuminated by the illumination lamp 112 that keeps moving immediately beneath the reading glass 120. The reflected light from the front surface of the original passes through the optical system starting with the first mirror 113 and is focused on the CCD 117. The CCD 117 then converts the reflected light into an electrical signal. That is, the reflected light is converted into an image signal of each of red, green, and blue colors of RGB color space. The surface of the conveyer drum 124 is a white plate facing the reading glass 120 and has white color to function as a white reference surface.

An imaging unit 133 that includes a light source (not shown) and an imaging element (not shown) reads an image on the rear surface of the original and performs photoelectric conversion of the image. That is, the image on the rear surface is converted into an image signal of each of red, green, and blue colors of RGB color space. The imaging unit 133 is arranged opposite a white plate 134 and the original passes through a space between the imaging unit 133 and the white plate 134.

A reference white plate 119 and a base point sensor 129, which detects the first carriage, are arranged in a space between the reading glass 120 and a positioning scale 132, which determines the start point of the original. The reference white plate 119 is used to perform correction (shading correction) of fluctuation in data that, even if an original with uniform image density is read, occurs due to, for example, fluctuation in emission intensity of the illumination lamp 112, fluctuation in a main-scanning direction, or fluctuation in photographic sensitivity of the CCD 117 with respect to each pixel.

A base 128 of the ADF 12 is hinged at the rear side (depth direction with respect to FIG. 2) with a base (not shown) of the scanner 110. A handle 130 is arranged on the front side (near direction with respect to FIG. 2) of the base 128. By using the handle 130, it is possible to pull up the base 128 and open the ADF 12. A switch (not shown) that detects opening and closing the ADF 12 is arranged on the rear side of the base 128. A pressure plate 131 is arranged on the base end surface of the ADF 12 and opposite to the exposure glass 111. When the ADF 12 is closed, the bottom surface of the pressure plate 131 makes contact with the top surface of the exposure glass 111 (see FIG. 2).

Figure 3:
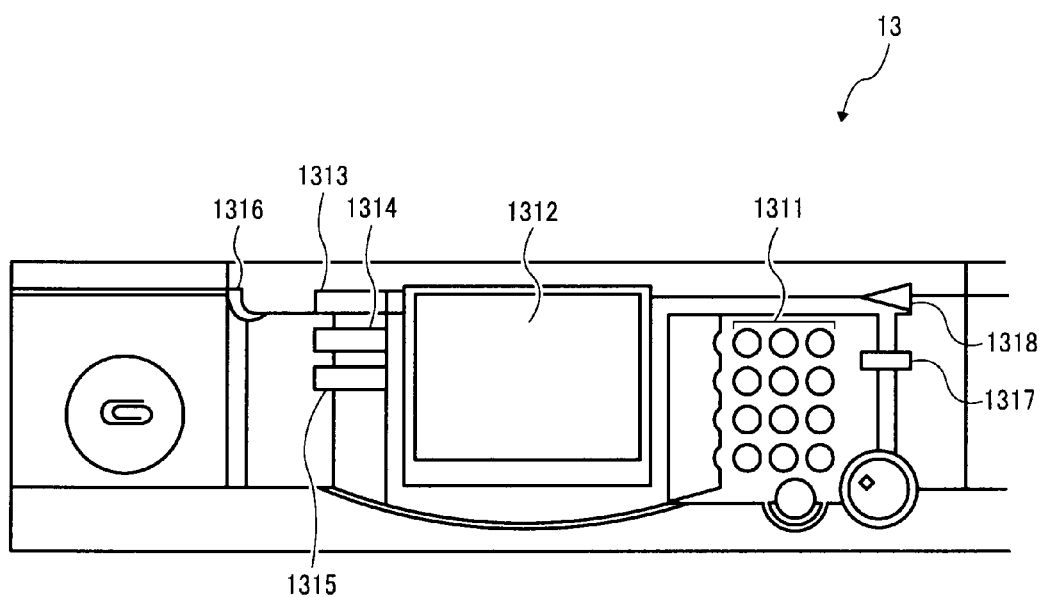
FIG. 3 is a schematic diagram of an exemplary external appearance of an operation display unit shown in FIG. 1.

FIG. 3 is a schematic diagram of an exemplary external appearance of the operation display unit 13. The detailed configuration and operations of the operation display unit 13 are described with reference to FIG. 3.

The operation display unit 13 includes a numeric keypad 1311, an LCD screen 1312, a guidance key 1313, a program key 1314, an area processing key 1315, a brightness adjustment knob 1316, a mode clear preheat/timer key 1317, and an interrupt key 1318.

The numeric keypad 1311 includes numeric keys of digits from 0 to 9 that can be pressed for setting the desired number of printed copies. The LCD screen 1312 is used to display the status of the image forming apparatus 10 and display operation messages to the user. The guidance key 1313 is used to switch to a mode for displaying description of functions and operating instructions. The program key 1314 is used to perform setting, registration, or invocation of frequently used modes. The area processing key 1315 is used to specify print areas and set a printing mode for each print area. The brightness adjustment knob 1316 is used to adjust the brightness of the LCD screen 1312. The interrupt key 1318 is used to interrupt an ongoing printing operation for initiating printing of another original.

The mode clear preheat/timer key 1317 is pressed to undo previous settings. Moreover, continuous pressing of the mode clear preheat/timer key 1317 for more than a certain length of time results in transition to a preheat state (preheat mode). In the preheat mode, the fixing temperature is reduced to a certain temperature (e.g., 10° C.) and the display on the LCD screen 1312 is cleared thereby saving the electricity consumption.

The transition to the preheat mode occurs when the user performs a corresponding key input from the operation display unit 13 or occurs automatically after a predetermined elapsed time since the last operation in the image forming apparatus 10. The preheat mode is cancelled when the user performs a corresponding key input from the operation display unit 13 or when a human body detecting sensor 74 described later detects that a person is standing in front of the image forming apparatus 10.

The LCD screen 1312 includes a touch panel detecting circuit that enables the user to touch operation buttons displayed on the LCD screen 1312 for inputting instructions.

Figures 4, 5:
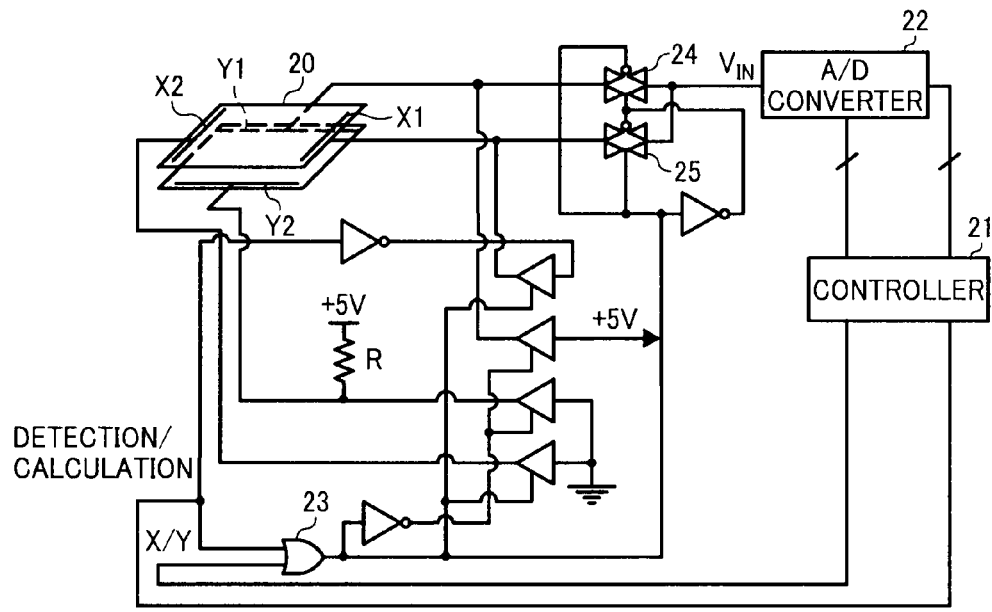
FIG. 4 is a schematic diagram of an exemplary configuration of a touch panel detecting circuit in the image forming apparatus.
FIG. 5 is a schematic diagram for explaining exemplary setting of elements in the touch panel detecting circuit shown in FIG. 4.

FIG. 4 is a schematic diagram of an exemplary configuration of the touch panel detecting circuit. As shown in FIG. 4, the touch panel detecting circuit includes a touch panel 20, a controller 21 that controls the touch panel detecting circuit in entirety, and an analog/digital (A/D) converter 22 that converts analog signals to digital signals. The detailed configuration and operations of the touch panel detecting circuit are described below with reference to FIG. 4.

In the touch panel detecting circuit, elements X1 and X2 and elements Y1 and Y2 are arranged on two transparent plates. A circuit including the elements Y1 and Y2 is connected (pulled-up) to a positive power supply by an active element. In the element Y1, an electric potential of +5 volts is detected in an OFF state of the touch panel 20 when not pressed and an electric potential of 0 volts is detected in an ON state of the touch panel 20 upon being pressed. Consequently, the A/D converter 22 can detect the output of the element Y1 and determine whether the touch panel 20 is pressed.

The controller 21 verifies that the touch panel 20 is in the ON state after being pressed and switches to a calculation mode in which the position coordinates of the pressed touch panel 20 are calculated. To calculate the X-coordinate of the pressed touch panel 20, an electric potential of +5 volts is detected in the element X1 and an electric potential of 0 volts is detected in the element X2 and the electric potential of the pressed X-coordinate is connected to the A/D converter 22 via the element Y1. The Y-coordinate is also calculated in an identical manner to obtain the position coordinates of the pressed touch panel 20.

FIG. 5 is a schematic diagram for explaining exemplary setting of elements in the touch panel detecting circuit shown in FIG. 4. The elements X1, X2, Y1, and Y2 are set with reference to FIG. 5. The setting of the elements X1, X2, Y1, and Y2 is described below with reference to FIGS. 4 and 5.

The digit "1" in "detection" in the input side ("IN" in FIG. 5) of an OR circuit 23 shown in FIG. 4 indicates an ongoing detection operation for detecting whether the touch panel 20 has been pressed. On the other hand, the digit "0" in "detection" in the input side ("IN" in FIG. 5) of the OR circuit 23 indicates that the coordinates at the pressed position of the touch panel 20 are being calculated without performing the detection operation.

The digit "1" in "X calculation" in the input side ("IN" in FIG. 5) of the OR circuit 23 indicates that an operation to calculate the X-coordinate at the pressed position of the touch panel 20 is specified. Similarly, the digit "0" in "X calculation" in the input side ("IN" in FIG. 5) of the OR circuit 23 indicates that an operation to calculate the Y-coordinate at the pressed position of the touch panel 20 is specified.

The notation "$V_{IN}$" in "X1" in the output side ("OUT" in FIG. 5) of the OR circuit 23 is the electric potential indicating the coordinates at the pressed position of the touch panel 20. Moreover, the notation "H" indicates a high condition of the digital signal, the notation "L" indicates a low condition of the digital signal, and the notation "Z" indicates a high impedance condition.

Meanwhile, tri-state buffers 24 and 25 shown in FIG. 4 are switches that control the direction of electrical current and that operate when one of the elements X2 and Y2 are set to a high impedance condition.

Figure 6:
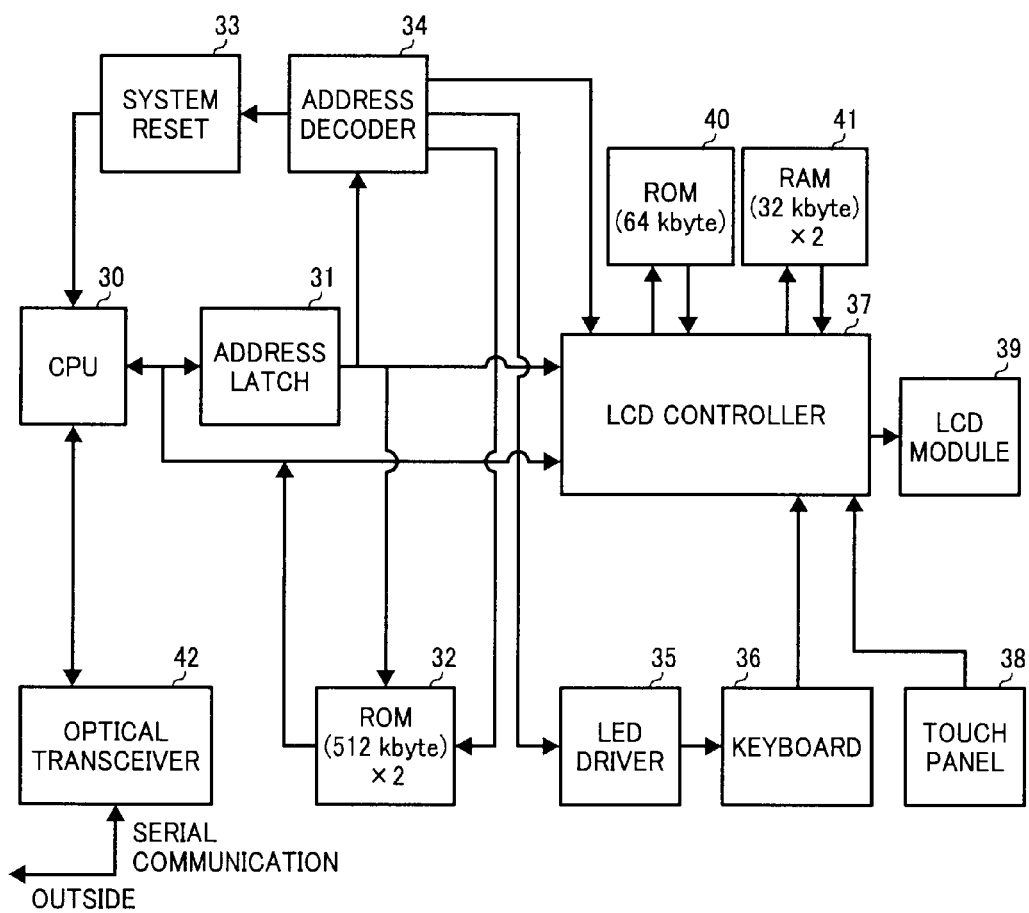
FIG. 6 is a block diagram of an example of an operation display unit in the image forming apparatus.

FIG. 6 is a block diagram of the operation display unit 13. The configuration and operations of the operation display unit 13 are described with reference to FIG. 6. The operation display unit 13 includes a central processing unit (CPU) 30, an address latch 31, read only memories (ROMs) 32 and 40, a system reset 33, an address decoder 34, a light emitting diode (LED) driver 35, a keyboard 36, an LCD controller 37, a touch panel 38, an LCD module 39, a random access memory (RAM) 41, and an optical transceiver 42.

An address signal output by the CPU 30 is input to the address latch 31 and is controlled by a signal from the CPU 30. A part of the address signal output by the address latch 31 is input to the address decoder 34. In the address decoder 34, a chip select is created for each integrated circuit (IC) and used for memory map creation. Meanwhile, the address signal is input to the memories such as the ROMs 32 and 40 and the RAM 41 or to the LCD controller 37 and used for address assignment.

A data bus from the CPU 30 is connected to the memories such as the ROMs 32 and 40 and the RAM 41 or to the LCD controller 37 for mutual data communication. The LCD controller 37 creates display data from the data stored in the ROM 40 and the RAM 41 according to a signal from the keyboard 36 or from the touch panel (LCD screen 1312) and controls the display on the LCD module 39.

Figure 7:
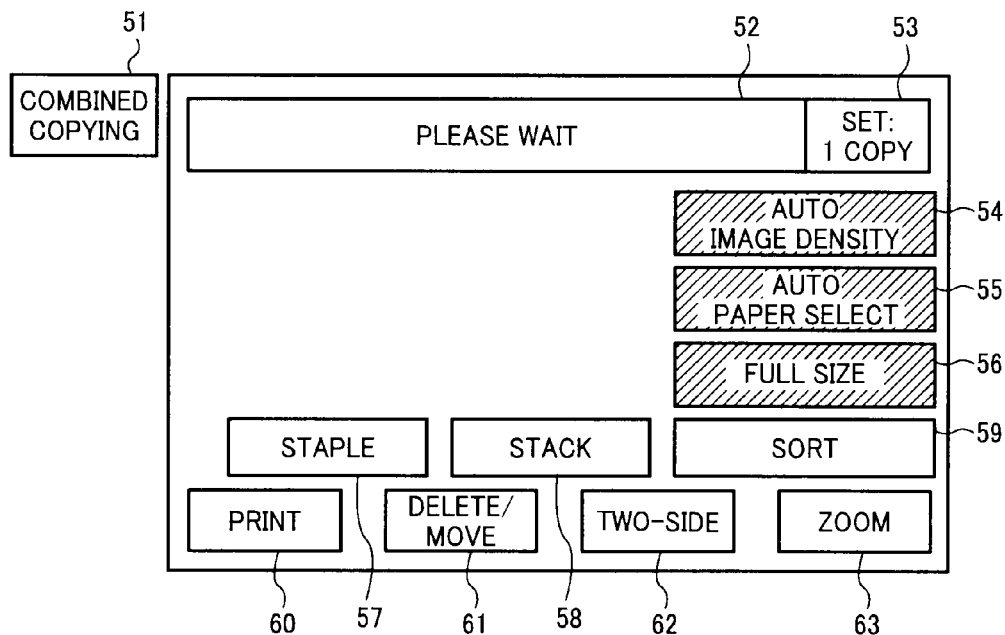
FIGS. 7 and 8 are schematic diagrams of examples of liquid crystal display (LCD) screen pages displayed on the image forming apparatus.
Figure 8:
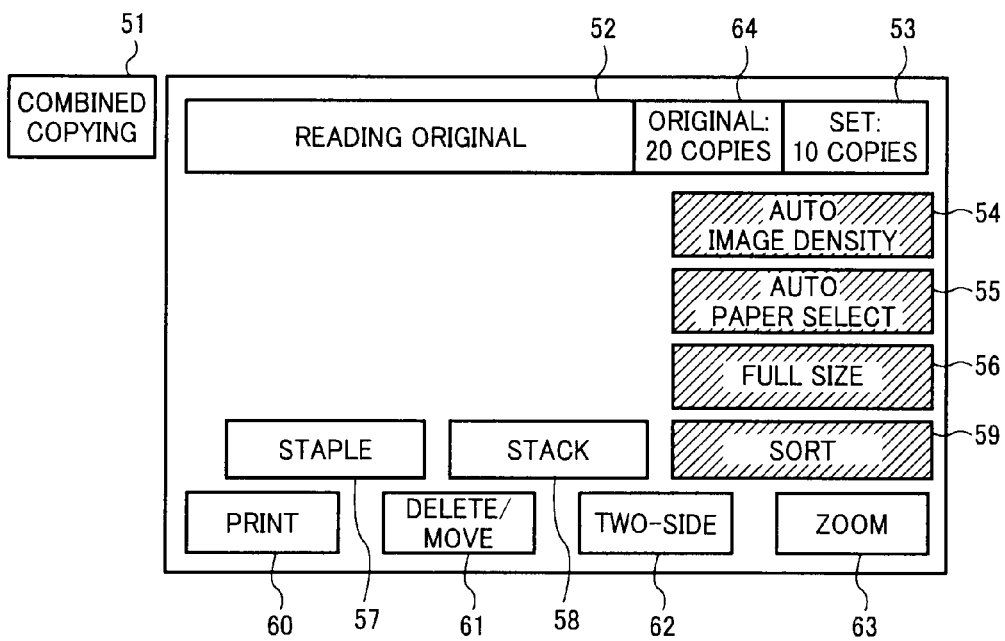

FIGS. 7 and 8 are schematic diagrams of examples of LCD screen pages displayed on the image forming apparatus 10. The description of the LCD screen pages and the surrounding region is given with reference to FIGS. 7 and 8. A combined copying key 51 shown in FIGS. 7 and 8 is a hardware key that is pressed to make transition to a combined mode in which two image forming apparatuses print copies in conjunction with each other. When the combined copying key 51 is pressed, an LCD thereof lights up indicating that the combined mode is selected.

A message area 52 is used to display messages such as "ready for copying" or "please wait". A copy number display unit 53 is used to display the number of print copies of the original. When an auto image density key 54 is pressed, the image density is adjusted in an automatic manner. When an auto paper selection key 55 is pressed, a sheet of transfer paper that has an appropriate size with respect to the original is selected in an automatic manner. A full size key 56 is pressed to set the printing magnification to 100%.

When a sorting key 59 is pressed, each set of printed transfer papers is collated by page order. When a stapling key 57 is pressed, each collated set of printed transfer papers is stapled together. When a stacking key 58 is pressed, the set of printed transfer papers is divided into page-based sets.

Meanwhile, the image forming unit 14 shown in FIG. 1 includes the two-side unit 15, the discharged-sheet sorting unit 16, and the feeding cassette 17, and performs electrophotographic printing, thermal transfer printing, or inkjet printing on an image received in an electrical signal such that an image is formed on a sheet of regular paper or heat-sensitive paper. Moreover, an electrical signal converted by the image reading unit 11, an electrical signal of an image input to the image forming unit 14, and a signal used to obtain synchronization with an electrical signal of an image is referred to as a video signal or image data. Furthermore, the add-on unit 18 controls add-on functions (applications) executable in the image forming apparatus 10.

In this way, in an image forming apparatus according to the present embodiment, an electrical signal of a read image is processed in various formats and output externally by using communication tools. That enables to widen the application fields of the image forming apparatus as compared to conventional analog image forming apparatuses. For example, it becomes possible to implement functions such as facsimileing, page printing, scanning, and file system.

At the time of performing copying, the read image data can be temporarily stored in a memory device such as a dynamic random access memory (DRAM) and can be read therefrom as per the requirement. As a result, at the time of performing copying of a plurality of pages, it becomes possible to print a plurality of pages with scanning performed only once. Moreover, a function of printing a plurality of originals on a single sheet of transfer paper (hereinafter, "memory function") has also been put into practice.

Figure 9:
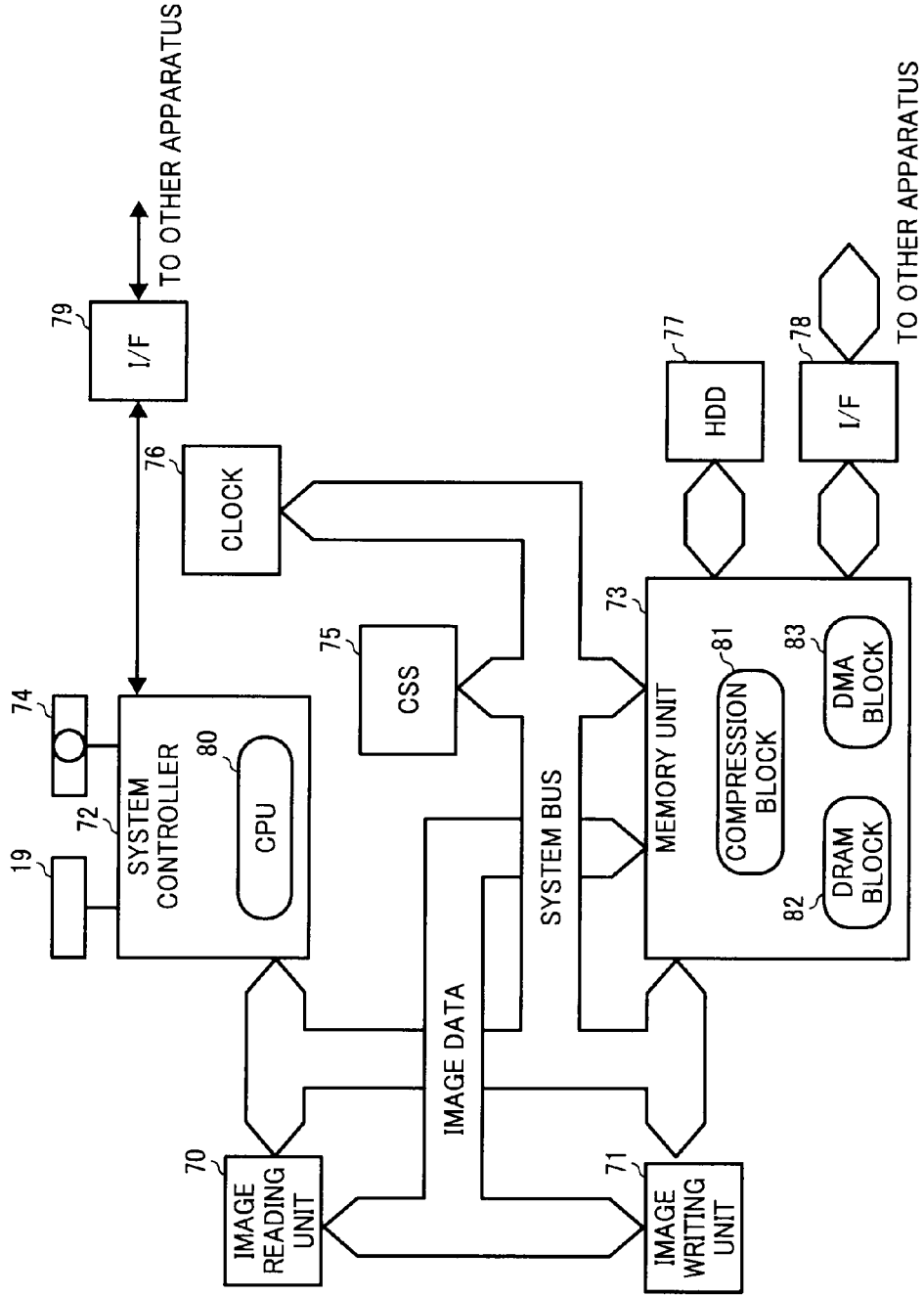
FIGS. 9 and 10 are schematic diagrams of configuration examples of the image forming apparatus.
Figure 10:
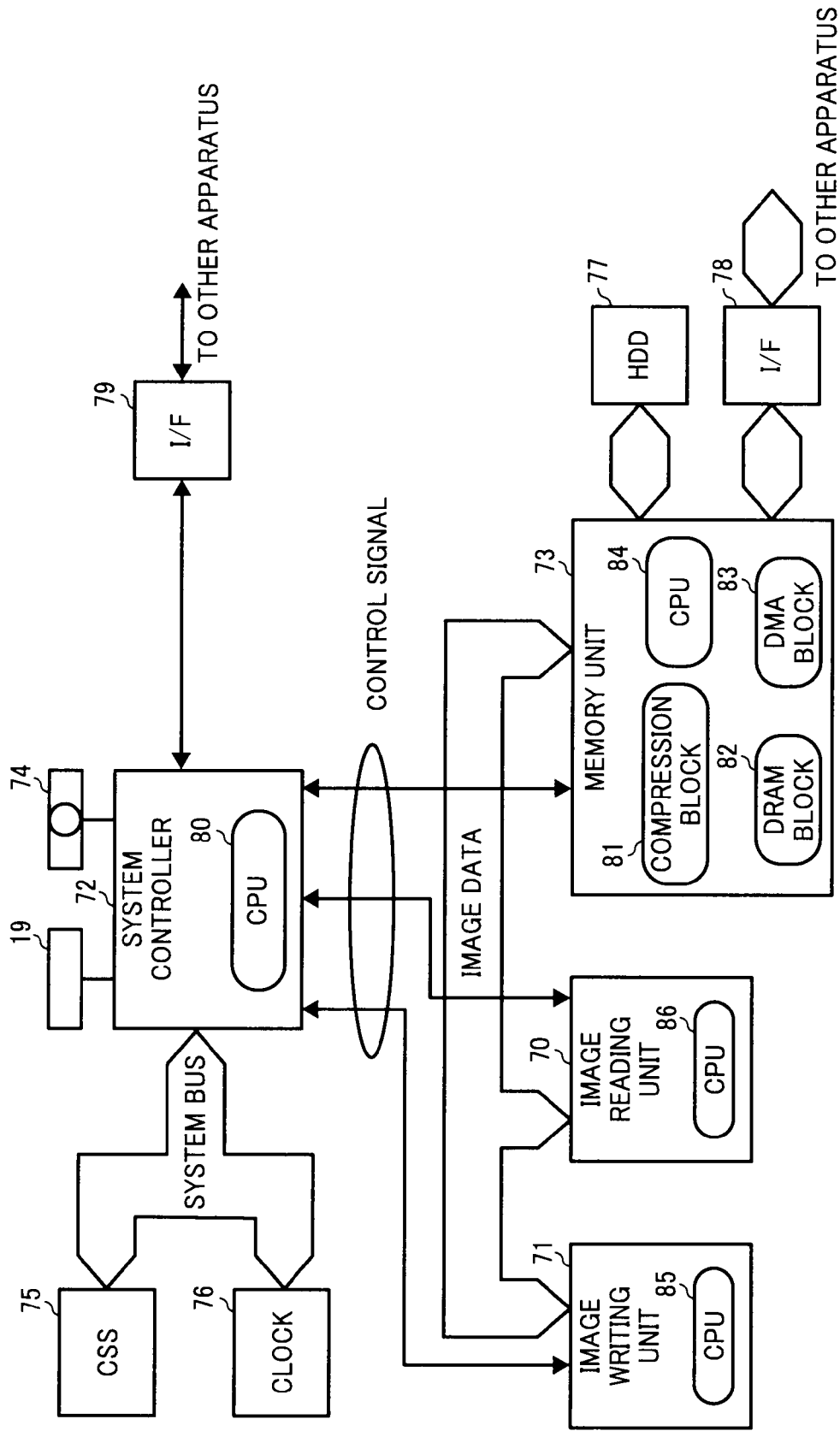

FIGS. 9 and 10 are schematic diagrams of configuration examples of the image forming apparatus 10.

The image forming apparatus is configured of circuit blocks shown in FIGS. 9 and 10 and includes an image reading unit 70, the image writing unit 71 for image processing and printing, a system controller 72, a memory unit 73, the user regulating unit 19, the human body detecting sensor 74, a remote diagnosis unit (customer support system (CSS)) 75 functioning as a detecting unit, a clock 76, a hard disk drive (HDD) 77, and interfaces (I/Fs) 78 and 79 functioning as communication tools.

The system controller 72 includes a CPU 80 and controls various processes to executing a copying mode. For example, to enable the image writing unit 71 to form an image, the system controller 72 controls sheet conveying process, electrophotographic process, and monitoring of faulty conditions or monitoring of feeding cassette status (presence or absence of transfer paper sheets). Similarly, to enable the image reading unit 70 to read an image, the system controller 72 controls scanning operation or ON/OFF operations of the light source. Meanwhile, image forming apparatuses of recent years are being equipped with more than one add-on functions. A digital image forming apparatus that shares a single resource is referred to as a system and a controller that controls such a system is sometimes referred to as a system controller. The term resource points to a function unit shared by a plurality of add-on functions. The system controller 72 performs system control for each resource and, in the image forming apparatus 10 shown in FIG. 1, controls the image reading unit 11, the image forming unit 14, the operation display unit 13, memories, and peripheral components (the ADF 12, the two-side unit 15, and the discharged-sheet sorting unit 16) as resources.

The memory unit 73 is used to store image data and used as a buffer while communicating image data between image forming apparatuses over a network. In the present embodiment, although a DRAM is used, any other memory device can be used to achieve the same result. Moreover, by using the HDD 77 along with the DRAM, it becomes possible to secure a larger storage capacity.

The clock 76 is arranged to perform a weekly timer function in which the image forming apparatus is started up and shut down at a predetermined time on every day. To perform the weekly timer function, a function is required that matches the time of a clock module and sets ON/OFF time.

Figure 11:
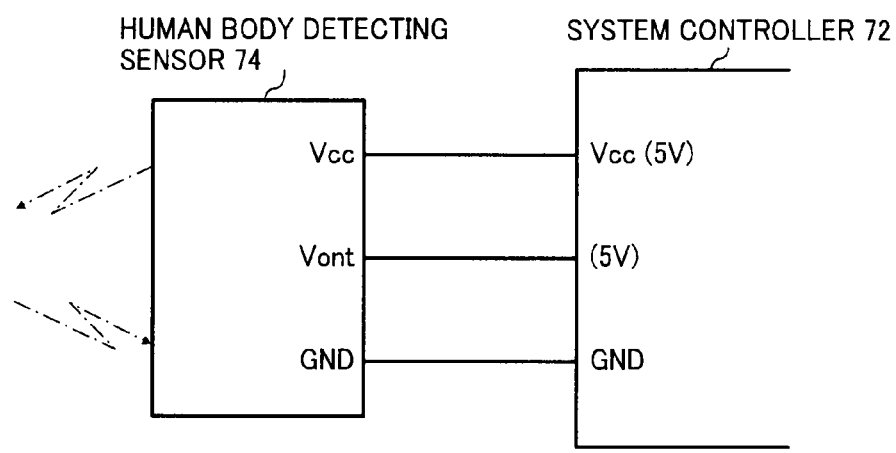
FIG. 11 is a schematic diagram of a configuration example of a human body detecting sensor in the image forming apparatus.

FIG. 11 is a schematic diagram of a configuration example of the human body detecting sensor 74. The human body detecting sensor 74 includes an LED (not shown) that emits infrared light, an optical unit (not shown) that controls the emission of infrared light in a constant direction, and an infrared light receiving sensor (not shown) that detects the reflected light of the emitted infrared light. The human body detecting sensor 74 sends a signal to the system controller 72 upon detecting an object such as the user at a certain distance from the image forming apparatus.

Moreover, the human body detecting sensor 74 includes a detecting-distance changing switch (not shown) that enables to switch between two different detecting distances. By arranging the human body detecting sensor 74 on the arrangement side of the operation display unit 13, it becomes possible to detect whether the user has come close to the image forming apparatus. Thus, the human body detecting sensor 74 is useful in implementing a function by which the preheat mode of the image forming apparatus is automatically cancelled if the user moves closer to the image forming apparatus.

Figure 12:
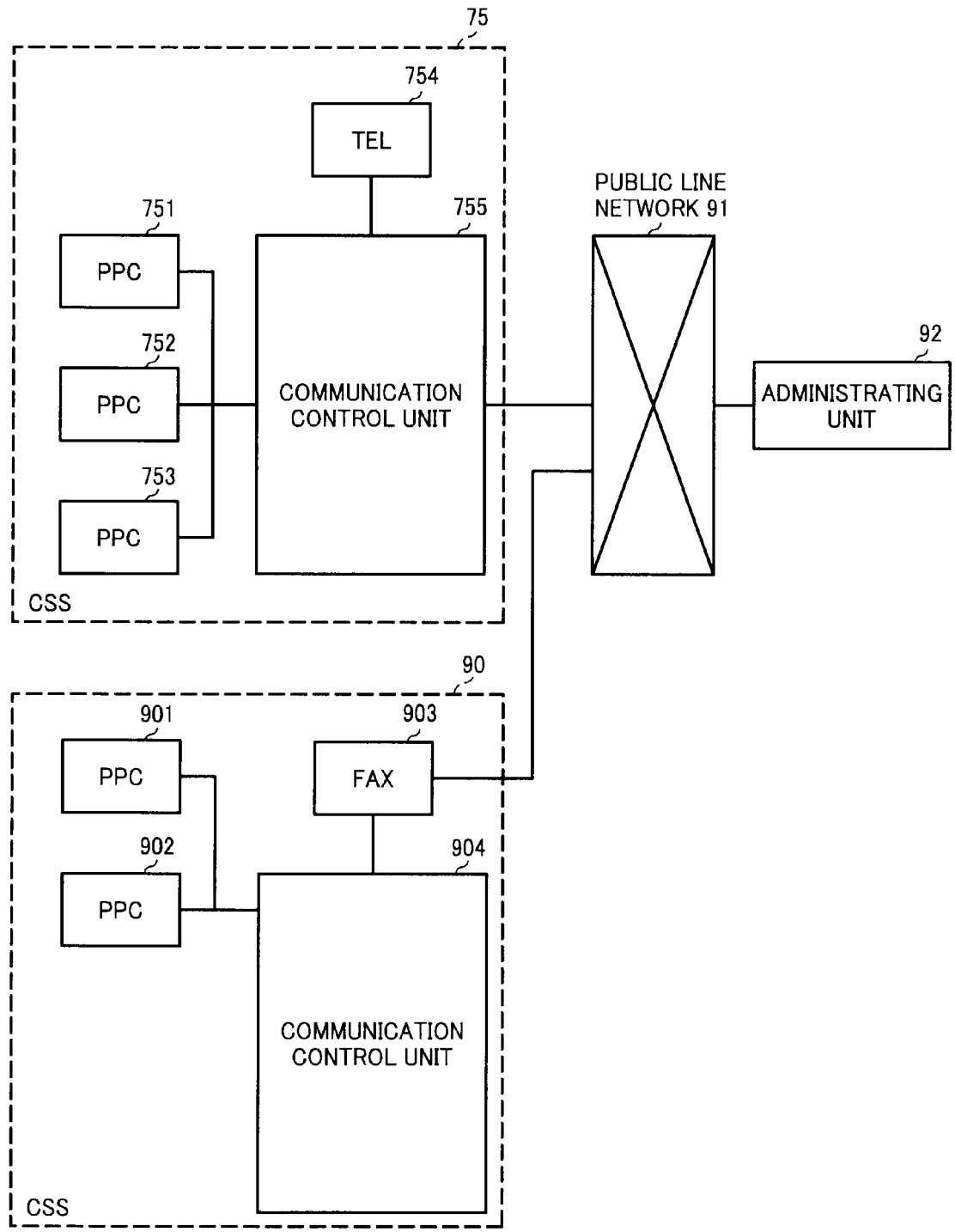
FIG. 12 is a block diagram of an example of a remote diagnosis system including remote diagnosis units.

FIG. 12 is a block diagram of an example of a remote diagnosis system including remote diagnosis units (CSSs) 75 and 90.

The remote diagnosis system includes the remote diagnosis units (CSSs) 75 and 90, a public line network 91, and an administrating unit 92. The remote diagnosis unit (CSS) 75 includes plain paper copiers (PPCs) 751 to 753 functioning as image forming apparatuses, a telephone set (TEL) 754, and a communication control unit 755. The remote diagnosis unit (CSS) 90 includes PPCs 901 and 902, a facsimileing device (FAX) 903, and a communication control unit 904.

The administrating unit 92 located at a service base and the PPCs 751, 752, 753, 901, and 902 located at the user side are connected via the public line network 91. More particularly, at the user side, the PPCs 751 to 753 and 901 and 902 are connected via the communication control units 755 and 904, respectively, which control the communication with the administrating unit 92. Moreover, the telephone set (TEL) 754 and the facsimileing device (FAX) 903 can be inserted into the line for establishing connection with the communication control units 755 and 904, respectively.

One or more image forming apparatuses can be connected to each of the communication control units 755 and 904. Moreover, it is not necessary that the image forming apparatuses (e.g., plain paper copiers) connected to the communication control units 755 and 904 are of the same type. That is, it is possible to connect various types of image forming apparatuses. Herein, for the sake of convenience, each of the communication control units 755 and 904 is configured to be connectable to a maximum of five image forming apparatuses.

The communication control unit 755 and the PPCs 751 to 753 and the communication control unit 904 and the PPCs 901 and 902 are connected by using an RS-485 multi-drop connection in which each terminal can simultaneously use the data from the line. Meanwhile, instead of using the RS-485 standard, it is also possible to use other communication standards to achieve the same result.

The communication control between the communication control unit 755 and the PPCs 751 to 753 and the communication control between the communication control unit 904 and the PPCs 901 and 902 is performed by basic mode data transmission control procedures. For that, data links are established by a polling/selecting technique of centralized control with the communication control units 755 and 904 as control stations and communication is performed with the PPCs 751 to 753 and the PPCs 901 and 902, respectively. An address setting switch (not shown) is used to set a unique value to each of the PPCs 751 to 753 and the PPCs 901 and 902 and a polling address or a selecting address of each of the PPCs 751 to 753 and the PPCs 901 and 902 is determined.

The remote diagnosis units (CSSs) 75 and 90 perform remote diagnosis. That is, in case of a machine error, the remote diagnosis units (CSSs) 75 and 90 perform automatic notification to the service center and remotely monitor the execution status/usage status of the image forming apparatuses. In the present embodiment, the remote diagnosis unit (CSS) 75 includes a detecting unit (not shown) that, when image data is sent from one image forming apparatus to another image forming apparatus for image processing, detects whether the other image forming apparatus is equipped with an image processing unit that can perform image processing according to read characteristics of the image data.

Given below is the description of the configuration and functionality of the memory unit 73 with reference to FIGS. 9 and 10. As shown in FIG. 9, the memory unit 73 includes a compression block 81, a DRAM block 82, and a direct memory access (DMA) block 83. In the configuration shown in FIG. 10, the memory unit 73 includes a CPU 84 in addition to the configuration shown in FIG. 9. The HDD 77 is connected to the memory unit 73.

The compression block 81 is used for data compression and data decompression. Thus, by performing compression of the read image data, it becomes possible to enhance the space efficiency of the memory such as the DRAM block 82 or the HDD 77.

The DRAM block 82 is used to store the image data read by the image reading unit 70. Moreover, upon receiving a request from the system controller 72, the image data stored in the DRAM block 82 is sent to the image writing unit 71. Meanwhile, a read address and a read direction with respect to the image writing unit 71 can be changed to perform image rotation processing.

When using the HDD 77 as the memory device, the compressed image data stored in the DRAM block 82 is sent to the HDD 77. The compressed image data stored in the HDD 77 is sent to the DRAM block 82 for decompression and the decompressed image data is sent to the image writing unit 71. Moreover, when the image data is read by more than one image reading units in the image reading unit 70, then characteristic parameters necessary for image processing can be set in advance in the DRAM block 82 or the HDD 77. The use of character parameters in image processing enables to treat the read image data having different read characteristics as standard image data and ensure uniform print quality.

In the configuration shown in FIG. 9, the image reading unit 70, the image writing unit 71, the memory unit 73, and the remote diagnosis unit (CSS) 75 are controlled only by the CPU 80 of the system controller 72. On the other hand, in the configuration shown in FIG. 10, the image reading unit 70, the image writing unit 71, and the memory unit 73 include CPUs 86, 85, and 84, respectively, to which a command from the system controller 72 is sent as a control signal. The control signal is used for data communication between the image reading unit 11, the image forming unit 14, and the add-on unit 18 shown in FIG. 1 and is also referred to as command issue.

Given below is the description with reference to FIG. 9 of a communication tool between an image forming apparatus (hereinafter, "operating-side apparatus") and another image forming apparatus connected over a network (hereinafter, "linked-side apparatus"). The I/F 78, which is considered to be the communication tool between the operating-side apparatus and the linked-side apparatus, is connected to the memory unit 73 and functions as an interface for transmitting data to the linked-side apparatus.

Thus, the operating-side apparatus is connected to the linked-side apparatus via the I/F 78. In the case of sharing printing jobs between the operating-side apparatus and the linked-side apparatus, the image data read by the operating-side apparatus is selected according to the print output mode and sent to the linked-side apparatus. At the same time, the image data in the operating-side apparatus is compressed and stored in the corresponding HDD 77. Similarly, data compression is also performed on the received data in the linked-side apparatus and the compressed data is stored in the corresponding HDD 77.

Subsequently, in each of the operating-side apparatus and the linked-side apparatus, the compressed data stored in the corresponding HDD 77 is obtained according to the copy output mode and decompressed before being expanded as image data in the corresponding DRAM block 82. Subsequently, the necessary number of copies of the image data is printed on the sheets of transfer paper. Meanwhile, the I/F 79 connected to the system controller 72 (see FIGS. 9 and 10) is an interface for communicating setting commands of, e.g., the copy output mode.

FIG. 13 is a schematic diagram for explaining examples of distributing print jobs between two interconnected image forming apparatuses. The features of print job distribution are described with reference to FIG. 13 when copies of a four-page original having pages A, B, C, D are output by using various output modes such as an electronic sorting output mode, a simple shared-stacking output mode, an original half-splitting shared-stacking output mode, and an original even-odd-splitting shared-stacking output mode.

In the electronic sorting output mode, copies of the original are sequentially output in page order and the output copies are divided into two sets having each having equal number of copies. Then, the two sets of copies are evenly distributed between the two image forming apparatus for printing. Thus, the electronic sorting output mode is a peculiar output mode in which the pages of the originals are printed in an automatically sorted manner.

In the simple shared-stacking output mode, copies of the original are divided into two sets. For example, when four copies are to be printed, each of the two image forming apparatuses is instructed to print two copies per page. Thus, the simple shared-stacking output mode enables simultaneous printing by the two image forming apparatuses. Such an output mode is suitable when it is necessary to reduce the print processing time to half. Moreover, in the simple shared-stacking output mode, although it is necessary to organize the printed sheets, it may not necessarily be of substantial disadvantage when the relation between the number of pages in an original and the number of copies is considered. Moreover, it may not be disadvantageous even when it is necessary to evenly distribute the sheets output at two places.

In the original half-splitting shared-stacking output mode, all the pages to be printed are evenly divided into first-half pages and second-half pages and are printed by using the two image forming apparatuses. For example, to print the above-mentioned four-page original, the pages A and B are output at one of the two image forming apparatuses and the pages C and D are output at the other of the two image forming apparatuses. The sheets printed at the two image forming apparatuses can be stacked to obtain a normal print result as if printed by using a single image forming apparatus.

In the original even-odd-splitting shared-stacking output mode, the pages of the original are divided into odd-numbered pages and even-numbered pages and are printed by using the two image forming apparatuses. For example, to print the abovementioned four-page original, the odd-numbered pages A and C are printed at one of the two image forming apparatuses and the even-numbered pages B and D are printed at the other of the two image forming apparatuses. Moreover, in the original even-odd-splitting shared-stacking output mode, there might be a case in which it is necessary to rearrange the printed sheets according to original order.

In this way, according to the present embodiment, the user is allowed to select a suitable output mode from among the four output modes depending on the situation. More particularly, the user can directly input the desired output mode from the LCD screen 1312 of the operation display unit 13 shown in FIG. 3.

Figures 14, 15:
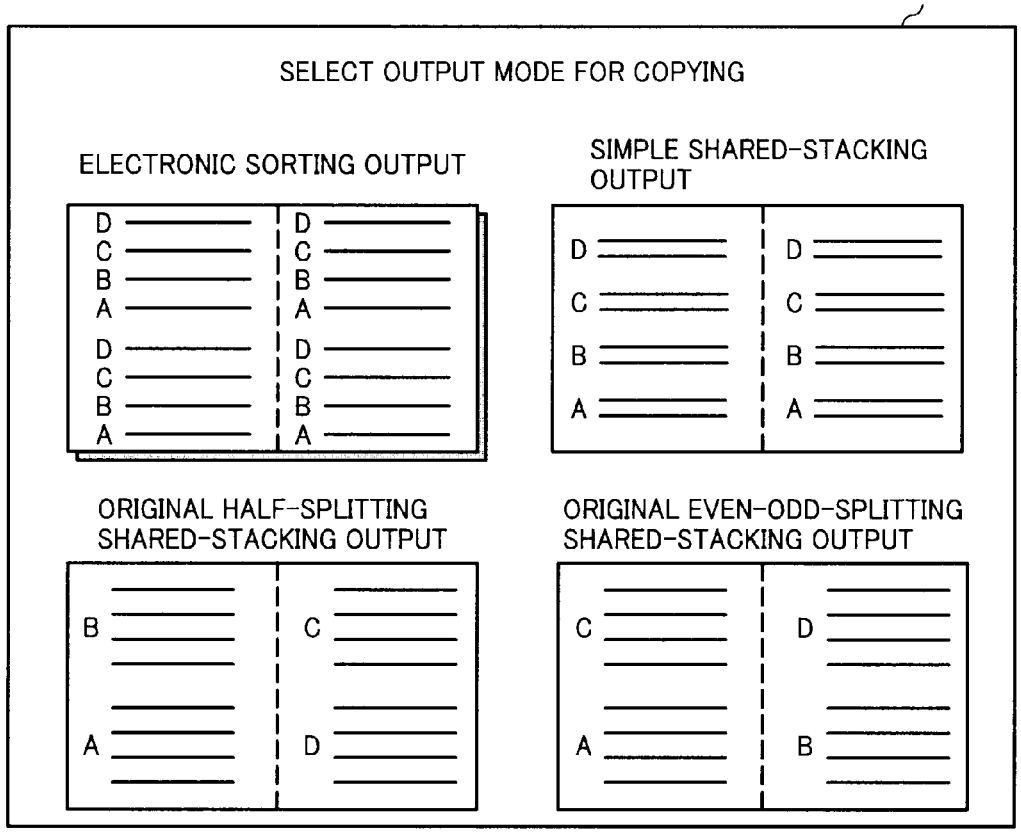
FIG. 14 is a schematic diagram of an exemplary LCD screen page displayed at the time of output mode selection in the image forming apparatus.
FIG. 15 is a schematic diagram of an example of an LCD screen page displayed for setting number of copies to be printed by each image forming apparatus when a print job is shared between two image forming apparatuses.

FIG. 14 is a schematic diagram of an exemplary LCD screen page displayed at the time of output mode selection. Given below is the description of selecting an output mode with reference to FIGS. 7, 8, and 14.

First, when the user selects combined copying by pressing the combined copying key 51 (see FIGS. 7 and 8), the four output modes are displayed on the LCD screen 1312 as shown in FIG. 14. That allows the user to select a suitable output mode. In FIG. 14, the electronic sorting output mode is shown with a shadow because it is assumed that the user touches and selects the electronic sorting output mode. However, in practice, the electronic sorting output mode is shown by negative/positive reversal to indicate that it is the currently selected output mode.

FIG. 15 is a schematic diagram of an example of an LCD screen page displayed for setting the number of copies to be printed by each image forming apparatus when a print job is shared between two image forming apparatuses. As shown in FIG. 15, it is possible to separately set the number of copies to be printed by the operating-side apparatus and the linked-side apparatus. For example, in the electronic sorting output mode and the simple shared-stacking output mode, apart from even distribution of the number of copies between the operating-side apparatus and the linked-side apparatus as described above, it is also possible to separately set the number of copies to be printed by the operating-side apparatus and the linked-side apparatus. Thus, for example, when a department A requests for 15 copies and when a department B requests for 10 copies, then the operating-side apparatus and the linked-side apparatus can be separately set to print 15 copies and 10 copies, respectively. That helps in eliminating the task of organizing the printed sheets.

Figure 16:
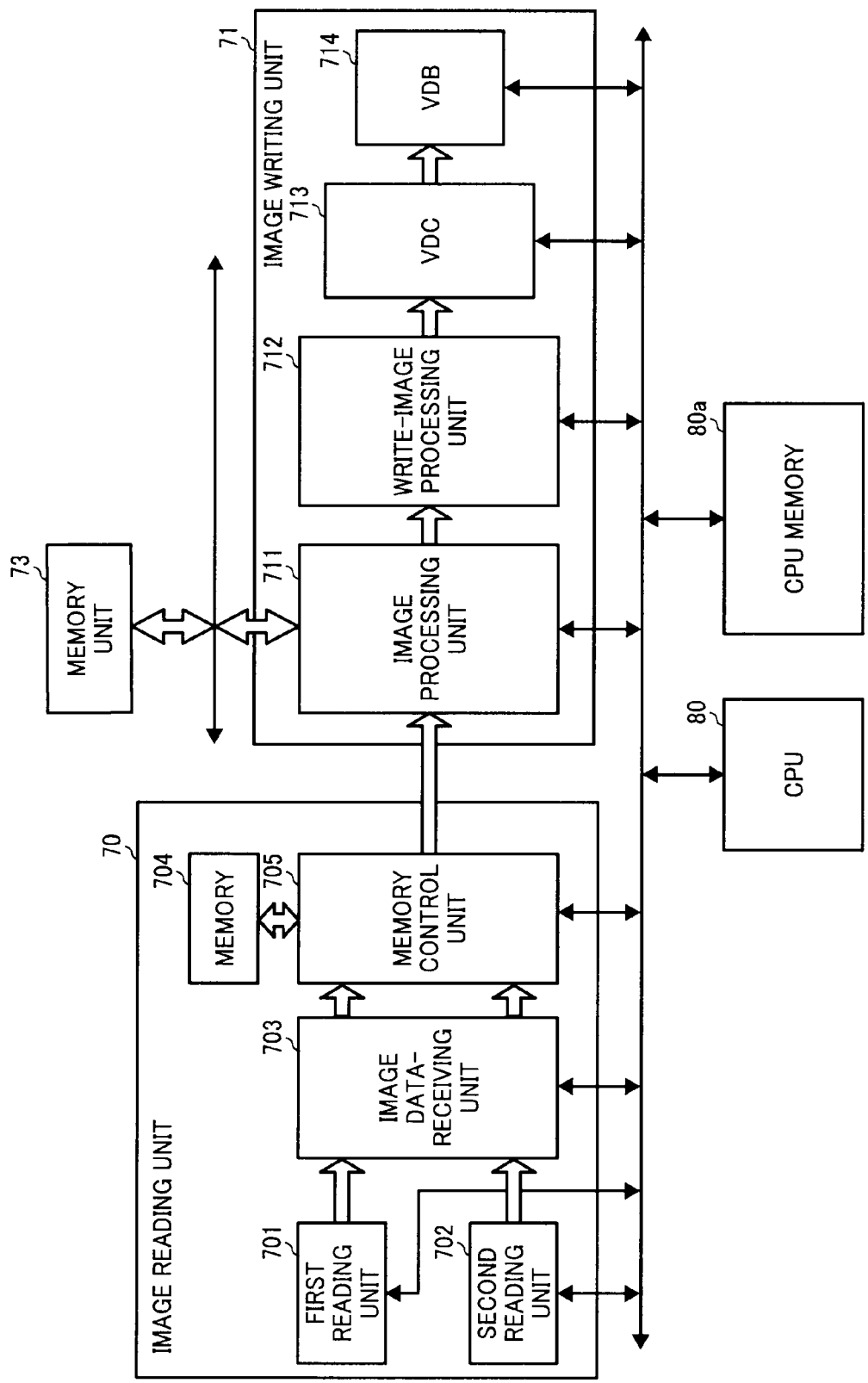
FIG. 16 is a block diagram of an image reading unit and an image writing unit shown in FIG. 9 or FIG. 10.
Figure 17:
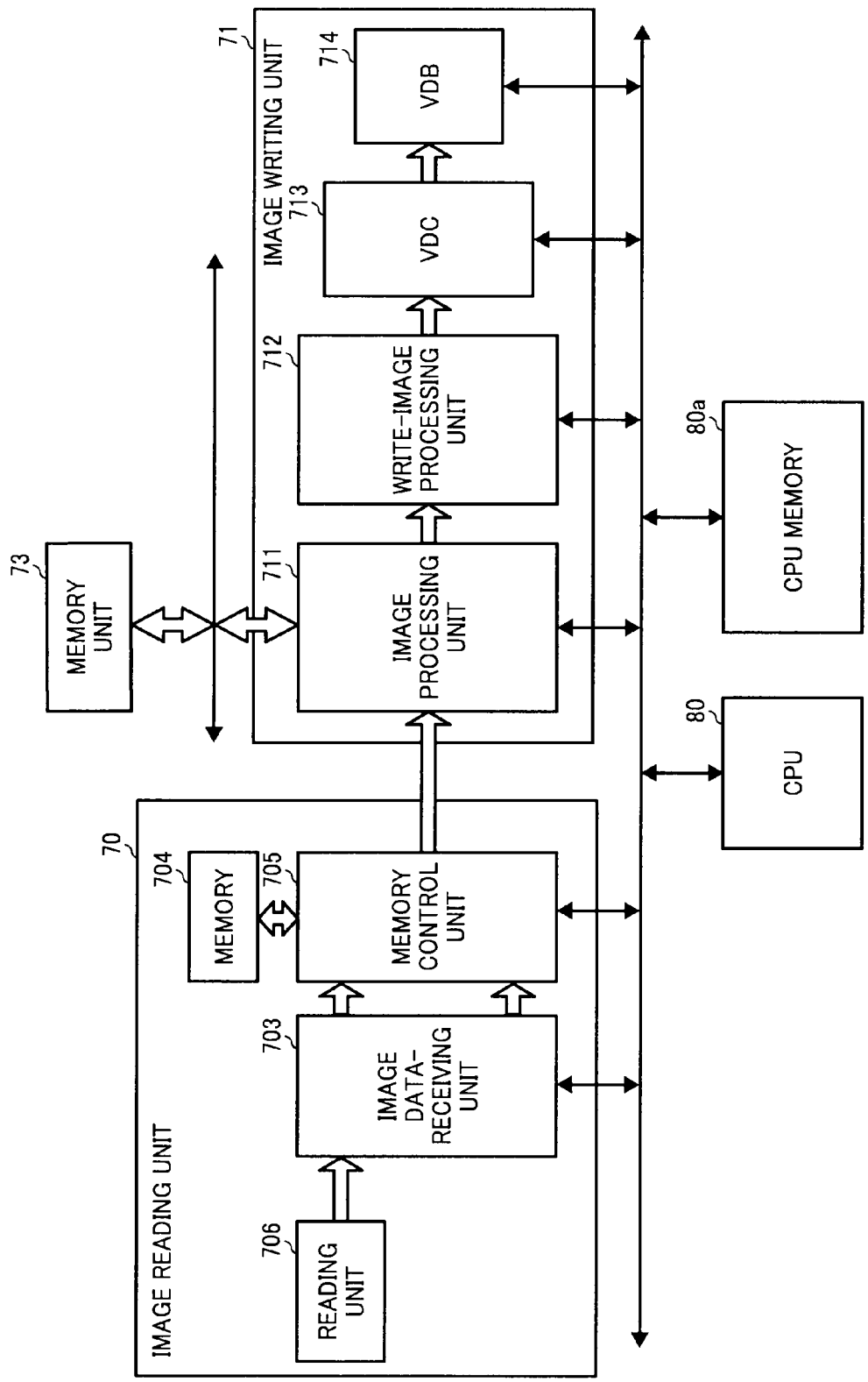
FIG. 17 is a block diagram of an image reading unit and an image writing unit of a linked-side apparatus when the image forming apparatus shown in FIG. 16 functions as an operating-side apparatus.

FIG. 16 is a block diagram of the image reading unit 70 and the image writing unit 71 shown in FIG. 9 or FIG. 10. FIG. 17 is a block diagram of an image reading unit and an image writing unit of a linked-side apparatus when the image forming apparatus shown in FIG. 16 functions as the operating-side apparatus. The following description is given with reference to FIGS. 9, 10, and 16.

The description with reference to FIG. 16 is given with focus on image data and control in the exemplary configurations shown in FIGS. 9 and 10. The image reading unit 70, the image writing unit 71, and the memory unit 73 can be described as having the following block configuration. A first reading unit 701 and a second reading unit 702 read image data by scanning an original with a scanner. The image data generated in each of the first reading unit 701 and the second reading unit 702 is input to an image data receiving unit 703. In the image data receiving unit 703, scanner processing is performed depending on the characteristics of the received image data. More particularly, the image data from each of the first reading unit 701 and the second reading unit 702 is subjected to various processing such as shading correction to correct the fluctuation in image density caused by distortion in the light intensity distribution or processing to adjust the background density according to the background density of the original. Subsequently, the processed image data is input to a memory control unit 705. The memory control unit 705 stores the image data per frame in a memory 704. Then, for example, from among the stored image data per frame, the image data per frame read by the first reading unit 701 is selected and sent to an image processing unit 711 in the image writing unit 71.

If, for example, the read characteristics of the first reading unit 701 and the second reading unit 702 are different, then the quality of the output image data differs irrespective of whether the same image is read. To solve such a problem, the image processing unit 711, which is a distinguishing constituent element of the present embodiment, absorbs the difference in the read characteristics such that uniform print data is obtained. For that, characteristic parameters (e.g., a gamma table, a filter parameter, a color correction parameter, etc.) according to the read characteristics (i.e., types of reading units) are stored in advance in the memory unit 73. At the time of printing, the image processing unit 711 reads the characteristic parameters corresponding to the image data of different read characteristics from the memory unit 73 and performs image processing. As a result, it becomes possible to eliminate the effect of read characteristics of reading units and generate standard image data.

Subsequently, the image processing unit 711 sends the processed image data to the memory unit 73 via a bus. Although not shown in FIG. 16, a memory device such as an HDD is connected to the memory unit 73 for the purpose of storing large volume of image data. Thus, the processed image data sent to the memory unit 73 is stored in the memory device. Subsequently, the memory unit 73 either receives subsequently input image data for storing or sends the stored image data to the image processing unit 711 for obtaining a hardcopy of the image data. In this way, the memory unit 73 is configured with a function to store the image data in a memory device and a function to control extraction of image data from the memory device (DMA block 83)

As it is assumed that the image data read by the first reading unit 701 is processed at first, the image data read by the second reading unit 702 is processed subsequently in an identical manner. That is, characteristic parameters corresponding to the read characteristics are read from the memory device and sent to the image processing unit 711 for image processing. The processed image data is then stored in the memory unit 73.

The image processing unit 711 receives the image data from the memory unit 73 and sends it to a write image processing unit 712. The write image processing unit 712 performs image processing suitable to obtain a hardcopy of the image data and sends the processed image data to a video display controller (VDC) 713.

The VDC 713 performs data preprocessing such as converting the image data into an image format suitable to a video drive board (VDB) 714 arranged subsequently as a printing unit and sends the processed image data to the VDB 714. The VDB 714 performs writing of the image data by, e.g., laser diode emission or another technique and transfers the image data on a sheet of paper to obtain the hardcopy of the image data.

Thus, as described with reference to FIG. 16, even if the characteristics of the image data read by the first reading unit 701 and the second reading unit 702 differ, the image processing unit 711 uses the assigned characteristic parameters corresponding to the read characteristics of the image data to perform image processing such that the difference in the image quality gets absorbed.

When sending the image data to another image forming apparatus connected over a network (linked-side apparatus), the characteristic parameters corresponding to the read characteristics of the image data are also sent to the linked-side apparatus. That enables the linked-side apparatus to perform image processing in such a way that the difference in the image quality of the image data having different read characteristics is absorbed. Meanwhile, the I/F 78 (shown in FIGS. 9 and 10 but not in FIG. 16) connected to the memory unit 73 is used to send image data to the linked-side apparatus.

In this way, the image writing unit 71 that functions as the printing unit includes the image processing unit 711 that, at the time of printing image data read by a plurality of reading units and having different read characteristics, performs image processing for printing according to the read characteristics of the image data. Subsequently, the processed image data is temporarily stored in the memory unit 73 and sent to another image forming apparatus for shared printing via the I/F 78 that functions as the communication tool. In that case, it is necessary that the other image forming apparatus to which the image data is to be sent has an identical configuration to the image forming apparatus that sends the image data (image forming apparatus shown in FIG. 16) or has a configuration as shown in FIG. 17 in which the configuration of an image reading unit 700 is different than that of the image reading unit 70 shown in FIG. 16 but the configuration of the image writing unit 71 including the image processing unit 711 is the same. Such a condition is laid to ensure that the other image forming apparatus to which the image data is to be sent is capable of performing image processing by which the difference in the print quality of the image data having different read characteristics is absorbed.

Moreover, when image data is to be sent from the operating-side apparatus to the linked-side apparatus for the purpose of shared printing, the remote diagnosis unit (CSS) 75 can be used to detect in advance whether the linked-side apparatus includes an image processing unit that can convert image data of different read characteristics into uniform print data. Subsequently, the image data can be sent to the linked-side apparatus if it is detected to include a suitable image processing unit. That is, the image data can be sent to the linked-side apparatus if it has the configuration identical to the operating-side apparatus shown in FIG. 16 or the configuration shown in FIG. 17.

Assume that the image forming apparatus shown in FIG. 16 is the operating-side apparatus and the image forming apparatus shown in FIG. 17 is the linked-side apparatus, and the operating-side apparatus and the linked-side apparatus share the task of reading image data. In that case, at the time of mutually transferring the read image data between the two image forming apparatuses, the characteristic parameters to be used for image processing are also transferred. As a result, even if the received image data has different read characteristics, it becomes possible to perform suitable image processing by using the corresponding characteristic parameters received along with the image data. That enables to enhance productivity and maintain uniform print quality.

Meanwhile, if, at the time of sending image data from the operating-side apparatus to the linked-side apparatus for the purpose of shared printing, the remote diagnosis unit (CSS) 75 detects in advance that the linked-side apparatus does not include a suitable image processing unit necessary to obtain uniform print quality, then the detection process of detecting a suitable image processing unit is performed with respect to another image forming apparatus connected over the network. If that image forming apparatus is detected to include a suitable image processing unit, then the operating-side apparatus sends the image data to that particular image forming apparatus. On the other hand, if that image forming apparatus also does not include a suitable image processing unit, then the detection process of detecting a suitable image processing unit is performed with respect to yet another image forming apparatus connected over the network. In this way, the detection process is repeated until an image forming apparatus including a suitable image processing unit is found. Moreover, if the detection process is performed with respect to each of the connected image forming apparatuses and if more than one of the connected image forming apparatuses are detected to include a suitable image processing unit, then the image forming apparatus to which the image data is to be sent can be determined depending on various conditions such as proximity with the operating-side apparatus or processing capacity.

Thus, in the abovementioned image forming apparatus and the image forming system, image processing is performed on image data, which may have been read by a plurality of reading units, by using characteristic parameters set according to read characteristics of the image data. Such a feature enables to maintain uniformity in the image quality.

Moreover, to perform image forming in a highly productive manner, it becomes necessary to send the read image data to another image forming apparatus for shared printing. In that case, the characteristic parameters necessary for image processing of the image data are also sent along with the image data to the other image forming apparatus. That enables an image processing unit of the other image forming apparatus to perform image processing by using the characteristic parameters. As a result, it is possible to achieve high productivity as well as maintain uniformity in image quality.

In this way, according to an aspect of the present invention, an image processing unit performs image processing on image data, which is generated by reading images of an original with a plurality of image reading units, based on parameters set according to read characteristics of the image data. The processed image data is stored in a storing unit and printed by using a printing unit. Moreover, a communication unit sends the stored image data to another connected image forming apparatus for shared printing. Thus, in the case of performing concurrent image processing by using a plurality of image reading units, it becomes possible to absorb the difference in read characteristics without causing variation in printing quality. That enables to maintain uniformity in printed data and high productivity of image processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A first image forming apparatus configured to be connected to a second image forming apparatus, the first and second image forming apparatuses each including a printing unit, the first image forming apparatus comprising:
   a plurality of image reading units, in the first image forming apparatus, each reading an image of an original and respectively outputting first and second image data;
   an image processing unit that performs image processing on each of the first and second image data based on a respective parameter set according to a respective read characteristic of a respective one of the plurality of image reading units that outputs the respective image data;
   a storing unit that stores the first and second image data;
   a printing unit that prints the first and second image data processed by the image processing unit; and
   a communication unit that exchanges the first and second image data stored in the storing unit with the second image forming apparatus, wherein
   the communication unit sends the first and second image data respectively output by the image reading units to the second image forming apparatus for sharing printing of the first and second image data,
   wherein the communication unit directly connects a first memory of the first image forming apparatus to a second memory of the second image forming apparatus such that communication is performed directly between an input of the first memory and an input of the second memory, and
   wherein the image processing unit is further configured to perform the image processing on each of the first and second image data based on the respective parameter, which is determined for each of the plurality of image read units according to both
   a first read characteristic of a first image reading unit of the plurality of image reading units, and
   a second read characteristic of a second image reading unit of the plurality of image reading units.

2. The image forming apparatus according to claim 1, wherein
   the first image forming apparatus further comprises a detecting unit that, before the communication unit sends the first and second image data to the second image forming apparatus, detects whether the second image forming apparatus includes a second image processing unit that is able to perform image processing on the first and second image data based on the respective read characteristic of the respective image reading unit, and
   when the detecting unit detects that the second image forming apparatus includes the second image processing unit that is able to perform image processing on the first and second image data based on the respective read characteristic of the respective image reading unit, the communication unit sends the first and second image data to the second image forming apparatus.

3. The image forming apparatus according to claim 2, wherein
   the detecting unit detects whether the second image forming apparatus includes the second image processing unit that performs image processing on image data based on a parameter set according to the read characteristic of third image reading unit, and when the detecting unit detects that the second image forming apparatus includes the second image processing unit that performs image processing on the first and second image data based on the respective parameter set according to the respective read characteristic of the respective image reading unit, the communication unit sends the first and second image data and the respective parameters to the second image forming apparatus.

4. The image forming apparatus according to claim 2, wherein
the first image forming apparatus is further connected to a third image forming apparatus, and
when the detecting unit detects that the second image forming apparatus does not include the second image processing unit that is able to perform image processing on the first and second image data based on the respective read characteristic of the respective image reading unit, the detecting unit detects whether the third image forming apparatus includes a third image processing unit that is able to perform image processing on the first and second image data based on the respective read characteristic of the respective image reading unit.

5. The image forming apparatus according to claim 2, wherein
the first image forming apparatus is further connected to a plurality of image forming apparatuses, and
when the detecting unit detects that the second image forming apparatus does not include the second image processing unit that is able to perform image processing on the first and second image data based on the respective read characteristic of the respective image reading unit, the detecting unit repeats a task of searching for an image processing unit that is able to perform image processing on the first and second image data based on the respective read characteristic of the respective image reading unit with respect to all of the plurality of image forming apparatuses to find an image forming apparatus that includes a desired image processing unit.

6. The image forming apparatus according to claim 1, wherein a user submitting a job including the first and second image data determines a portion of the first and second image data that is to be processed by the second image forming apparatus.

7. The image forming apparatus according to claim 6, wherein the portion of the first and second image data printed by the second image forming apparatus is unequal to a portion of the first and second image data printed by the printing unit.

8. The image forming apparatus according to claim 1, wherein a user submitting a job including the first and second image data specifies one of an electronic sorting output mode, a shared-stacking output mode, an original half-splitting shared-stacking output mode, and an original even-odd-splitting shared-stacking output mode for outputting the first and second image data.

9. An image forming system comprising a first image forming apparatus and a second image forming apparatus connected to each other, wherein
the first image forming apparatus includes
a plurality of image reading units, in the first image forming apparatus, each reading an image of an original and respectively outputting first and second image data,
a first image processing unit that performs image processing on each of the first and second image data based on a respective parameter set according to a respective read characteristic of a respective one of the plurality of image reading units that outputs the respective image data,
a first storing unit that stores the first and second image data,
a first printing unit that prints the first and second image data processed by the first image processing unit, and
a first communication unit that exchanges the first and second image data stored in the first storing unit with the second image forming apparatus,
the second image forming apparatus includes
a second communication unit that exchanges the first and second image data with the first image forming apparatus,
a second storing unit that stores the first and second image data and a respective parameter set according to a respective read characteristic of the respective image reading unit that outputs the first and second image data received from the first image forming apparatus,
a second image processing unit that performs an image processing on the first and second image data stored in the second storing unit based on the respective parameter, and
a second printing unit that prints the first and second image data processed by the second image processing unit,
wherein the first image forming apparatus and the second image forming apparatus share a printing of the image data output by the image reading units,
wherein the first and second communication units directly connect a first memory of the first image forming apparatus to a second memory of the second image forming apparatus such that communication is performed directly between an input of the first memory and an input of the second memory, and
wherein the first image processing unit is further configured to perform the image processing on each of the first and second image data based on the respective parameter, which is determined for each of the plurality of image read units according to both
a first read characteristic of a first image reading unit of the plurality of image reading units, and
a second read characteristic of a second image reading unit of the plurality of image reading units.

10. The image forming system according to claim 9, wherein
the second storing unit stores therein a plurality of parameters set according to the read characteristics of the plurality of image reading units in advance, and
when printing the first and second image data respectively output by the plurality of image reading units, the second image processing unit performs image processing on the first and second image data by reading the plurality of parameters, set according to the respective read characteristic of the respective image reading unit that obtains the first and second image data to be printed, out of the second storing unit.

11. The image forming system according to claim 9, wherein
the second image forming apparatus further includes a second image reading unit that reads an image of an original and outputs image data,
the plurality of image reading units of the first image forming apparatus and the second image reading unit of the second image forming apparatus read the image in a shared manner, the first communication unit and the second communication unit exchange image data and parameters set according to a respective read characteristic of each of the second image reading unit and the plurality of image reading units, the first image processing unit and the second image processing unit each perform image processing on the exchanged image data and the first printing unit and the second printing unit print the exchanged image data processed by the first image processing unit and the second image processing unit, respectively.

12. The image forming system according to claim 9, wherein the first image forming apparatus further includes a detecting unit that, before the first communication unit sends the first and second image data to the second image forming apparatus, detects whether the second image processing unit is able to perform image processing on the first and second image data based on the respective read characteristic of the respective image reading unit, and when the detecting unit detects that the second image processing unit is able to perform image processing on the first and second image data based on the respective read characteristic of the respective image reading unit, the first communication unit sends the first and second image data to the second image forming apparatus.

13. The image forming system according to claim 12, wherein the detecting unit detects whether the second image processing unit is able to perform image processing on the first and second image data based on the respective parameter set according to the respective read characteristic of the respective image reading unit, and when the detecting unit detects that the second image processing unit is able to perform image processing on the first and second image data based on the respective parameter set according to the respective read characteristic of the respective image reading unit, the first communication unit sends the first and second image data and the respective parameters to the second image forming apparatus.

14. The image forming system according to claim 12, further comprising a third image forming apparatus, wherein when the detecting unit detects that the second image processing unit is not able to perform image processing on the first and second image data based on the respective read characteristic of the respective image reading unit, the detecting unit detects whether the third image forming apparatus includes a third image processing unit that is able to perform image processing on the first and second image data based on the respective read characteristic of the respective image reading unit.

15. The image forming system according to claim 12, further comprising a plurality of third image forming apparatuses, wherein when the detecting unit detects that the second image processing unit is not able to perform image processing on the first and second image data based on the respective read characteristic of the respective image reading unit, the detecting unit repeats a task of searching for an image processing unit that is able to perform image processing on the first and second image data based on the respective read characteristic of the respective image reading unit with respect to all of the third image forming apparatuses to find an image forming apparatus that includes a desired image processing unit.

16. An image forming method for a first image forming apparatus that is configured to be connected to a second image forming apparatus each including a printing unit, the image forming method comprising:

reading, using each of a plurality of image reading units in the first image forming apparatus, an image of an original and outputting first and second image data;

performing, using an image processing unit, image processing on each of the first and second image data based on a respective parameter set according to a respective read characteristic of a respective one of the plurality of image reading unit units that outputs the respective image data;

storing the first and second image data in a storing unit;

printing, using a printing unit, the first and second image data processed at the performing; and communicating, using a communication unit, by exchanging the first and second image data stored at the storing with the second image forming apparatus, wherein the communicating further includes sending, using the communicating unit, the first and second image data output at the reading to the second image forming apparatus for sharing printing of the image data, the communication unit directly connects a first memory of the image forming apparatus to a second memory of the second image forming apparatus such that communication is performed directly between an input of the first memory and an input of the second memory, and wherein the image processing further includes performing the image processing on each of the first and second image data based on the respective parameter, which is determined for each of the plurality of image read units according to both a first read characteristic of a first image reading unit of the plurality of image reading units, and a second read characteristic of a second image reading unit of the plurality of image reading units.

17. The image forming method according to claim 16, wherein the image forming method further comprises detecting, using a detecting unit and before the communication unit sends the first and second image data to the first image forming apparatus, whether the second image forming apparatus includes a second image processing unit that is able to perform image processing on the first and second image data based on the respective read characteristic of the respective image reading unit, and when it is detected that the second image forming apparatus includes the second image processing unit that is able to perform image processing on the first and second image data based on the respective read characteristic of the respective image reading unit, at the detecting, the communicating, using the communication unit, sends the first and second image data to the second image forming apparatus.

18. The image forming method according to claim 17, wherein the detecting further includes detecting whether the second image forming apparatus includes a second image processing unit that is able to perform image processing on the first and second image data based on the respective parameter set according to the respective read characteristic of the respective image reading unit, and when it is detected that the second image forming apparatus includes a second image processing unit that is able to perform image processing on image data based on the respective parameter set according to the respective read characteristic of the respective image reading unit at the detecting, the communicating further sends the first and second image data and the respective parameters to the second image forming apparatus.

19. The image forming method according to claim 17, wherein the first image forming apparatus is further connected to a third image forming apparatus, and when it is detected that the second image forming apparatus does not include the second image processing unit that is able to perform image processing on the first and second image data based on the respective read characteristic of the respective image reading unit, at the detecting, the detecting further detects whether the third image forming apparatus includes a third image processing unit that is able to perform image processing on the first and second image data based on the respective read characteristic of the respective image reading unit.

20. The image forming method according to claim 17, wherein the first image forming apparatus is further connected to a plurality of image forming apparatuses, and when it is detected that the second image forming apparatus does not include the second image processing unit that is able to perform image processing on the first and second image data based on the respective read characteristic of the respective image reading unit, at the detecting, the detecting further repeats a task of searching for an image processing unit that is able to perform image processing on the first and second image data based on the respective read characteristic of the respective image reading unit with respect to all of the plurality of image forming apparatuses to find an image forming apparatus that includes a desired image processing unit.

\* \* \* \* \*